(12) United States Patent
Song et al.

(10) Patent No.: US 10,189,309 B2
(45) Date of Patent: Jan. 29, 2019

(54) WHEEL BEARING ASSEMBLY

(71) Applicant: ILJIN GLOBAL CO., LTD., Seoul (KR)

(72) Inventors: Jae Myeong Song, Gyeonggi-do (KR); Yunho Jung, Seoul (KR); Ha-Seok Oh, Seoul (KR)

(73) Assignee: ILJIN GLOBAL CO., LTD., Seoul (KR)

( * ) Notice: Subject to any disclaimer, the term of this patent is extended or adjusted under 35 U.S.C. 154(b) by 0 days.

(21) Appl. No.: 15/554,039

(22) PCT Filed: Oct. 22, 2015

(86) PCT No.: PCT/KR2015/011199
§ 371 (c)(1),
(2) Date: Aug. 28, 2017

(87) PCT Pub. No.: WO2017/069303
PCT Pub. Date: Apr. 27, 2017

(65) Prior Publication Data
US 2018/0043733 A1    Feb. 15, 2018

(51) Int. Cl.
*B60B 35/18* (2006.01)
*F16C 19/18* (2006.01)
(Continued)

(52) U.S. Cl.
CPC .............. *B60B 35/18* (2013.01); *B60B 21/08* (2013.01); *B60B 27/0005* (2013.01);
(Continued)

(58) Field of Classification Search
CPC ...... F16C 19/163; F16C 19/18; F16C 19/187; F16C 33/583; F16C 2220/46;
(Continued)

(56) References Cited

U.S. PATENT DOCUMENTS

| | | | | |
|---|---|---|---|---|
| 3,749,416 A | * | 7/1973 | Asberg | B60B 27/0005 188/18 A |
| 3,757,883 A | * | 9/1973 | Asberg | B60B 27/0005 180/370 |

(Continued)

FOREIGN PATENT DOCUMENTS

| | | | | |
|---|---|---|---|---|
| CN | 204140681 U | * | 2/2015 | ............... F16D 3/56 |
| DE | 10323310 A1 | * | 12/2004 | ............. B60B 27/02 |

(Continued)

OTHER PUBLICATIONS

International Search Report, issued in the corresponding PCT Application No. PCT/KR2015/011199, dated Jul. 19, 2016

*Primary Examiner* — Marcus Charles
(74) *Attorney, Agent, or Firm* — Hamre, Schumann, Mueller & Larson, P.C.

(57) ABSTRACT

Disclosed is a wheel bearing assembly comprising a wheel hub fastened to a vehicle wheel so as to rotate as a unit and having a plurality of fastening protrusion portions, and a brake disc having a plurality of fastening protrusion portions respectively fastened to the plurality of fastening protrusion portions of the wheel hub. Thus, the wheel bearing assembly may facilitate weight reduction and improvement in ease of assembly, and enhance run-out properties of sliding surfaces of the brake disc.

19 Claims, 11 Drawing Sheets

(51) Int. Cl.
*B60B 21/08* (2006.01)
*F16C 33/58* (2006.01)
*F16D 65/12* (2006.01)
*B60B 27/00* (2006.01)
*F16D 65/02* (2006.01)

(52) U.S. Cl.
CPC .......... B60B 27/0052 (2013.01); F16C 19/18 (2013.01); F16C 33/583 (2013.01); F16D 65/123 (2013.01); *F16C 19/187* (2013.01); *F16C 2326/02* (2013.01); *F16D 2065/1316* (2013.01); *F16D 2065/1384* (2013.01); *F16D 2200/0013* (2013.01); *Y02T 10/86* (2013.01)

(58) Field of Classification Search
CPC .............. F16C 2222/02; F16C 2223/06; F16C 2326/02; F16C 2200/0021; B60B 21/08; B60B 35/18; B60B 27/0005; B60B 27/0084; B60B 27/0094; B60B 27/0052; F16D 65/12; F16D 65/123; F16D 2065/1316; F16D 2065/1384; F16D 2200/0013
USPC ...... 384/537, 544, 569, 589; 301/6.8, 105.1; 188/18 A, 218 A, 218 XL
See application file for complete search history.

(56) References Cited

U.S. PATENT DOCUMENTS

| | | | |
|---|---|---|---|
| 4,792,020 A * | 12/1988 | Okumura | B60B 27/0005 188/18 A |
| 6,076,896 A * | 6/2000 | Bertetti | B60B 27/00 188/18 A |
| 6,247,219 B1 * | 6/2001 | Austin | B23B 5/04 29/434 |
| 6,564,913 B2 * | 5/2003 | Baumgartner | F16D 65/123 188/18 A |
| 6,626,273 B1 * | 9/2003 | Baumgartner | F16D 65/123 188/218 XL |
| 6,880,682 B2 * | 4/2005 | Gotti | B60B 27/001 188/218 R |
| 7,111,911 B2 * | 9/2006 | Baumgartner | F16D 65/123 188/218 XL |
| 8,950,556 B2 * | 2/2015 | Root | B60B 27/0052 188/18 A |
| 9,897,154 B2 * | 2/2018 | Root | F16D 65/123 |
| 2006/0029315 A1 * | 2/2006 | Loustanau | B60B 3/16 384/544 |
| 2009/0038895 A1 * | 2/2009 | Snyder | F16D 65/12 188/166 |
| 2011/0113637 A1 * | 5/2011 | Inoue | B60B 27/0005 33/203 |
| 2016/0025165 A1 * | 1/2016 | Plantan | F16D 65/123 188/218 XL |
| 2016/0375725 A1 * | 12/2016 | Bosco | B60B 27/0005 301/6.1 |
| 2017/0157982 A1 * | 6/2017 | Maltauro | B60B 27/023 |

FOREIGN PATENT DOCUMENTS

| | | | | |
|---|---|---|---|---|
| DE | 102004022372 A1 | * | 12/2005 | ............ B60B 3/002 |
| EP | 0917969 A2 | * | 5/1999 | ........ B60B 27/0005 |
| EP | 2799246 A1 | * | 11/2014 | ......... B60B 27/0042 |
| FR | 2723886 A1 | * | 3/1996 | ........ B60B 27/0005 |
| GB | 127685 A | * | 6/1919 | ............. B60B 11/06 |
| JP | 2005306257 | | 11/2005 | |
| KR | 20060108280 | | 10/2006 | |
| KR | 20120002148 | | 3/2012 | |
| KR | 20120128751 | | 11/2012 | |
| KR | 20150065040 | | 6/2015 | |
| KR | 20150065040 A | * | 6/2015 | ............. F16D 65/12 |
| WO | WO 2010012283 A1 | * | 2/2010 | ......... B60B 27/0005 |
| WO | WO-2012139856 A1 | * | 10/2012 | ............... B60B 3/14 |
| WO | WO-2015106760 A1 | * | 7/2015 | ............. B60B 3/041 |

* cited by examiner

WHEEL BEARING ASSEMBLY

TECHNICAL FIELD

The present disclosure relates to a wheel bearing assembly and, more particularly, to a wheel bearing assembly in which a wheel bearing and a brake disc are fastened and assembled by a plurality of fastening protrusion portions.

BACKGROUND

In general, a wheel bearing assembly is a device which supports a wheel so as to be rotatable with respect to a body of a vehicle. That is, a wheel bearing assembly includes a non-rotating element fixed to the body of the vehicle, a rotating element fixed to the wheel, and a plurality of rolling bodies provided between the non-rotating element and the rotating element to facilitate the relative rotation of the rotating element with respect to the non-rotating element.

The wheel bearing assembly further includes a brake disc mounted to the rotating element.

The brake disc is formed in a disc shape and extends radially outward. The brake disc extending radially outward is disposed between a pair of friction pads of a brake device for a vehicle.

If the pair of friction pads moves toward the brake disc and makes contact with the brake disc, the rotating element is decelerated or stopped by the friction between the friction pads and the brake disc. To that end, both sides of the brake disc are formed as friction surfaces.

A conventional brake disc has been formed as a monolithic piece by casting using grey cast iron. Further, the conventional brake disc thus formed is fastened to a rotating element of a wheel bearing assembly by bolts or the like.

However, grey cast iron is weaker in strength than steel due to its material properties, so that grey cast iron has a drawback of weighing a lot as the volume is increased in order to secure strength. In particular, as the entire brake disc is made as a monolithic piece by grey cast iron, not only the friction surface requiring friction but also the mounting portion that is mounted to the rotating element of the wheel bearing assembly is made of grey cast iron. This resulted in the problem of substantially increasing the weight, and such an increase in weight has a drawback of reducing the fuel efficiency of a vehicle.

Further, since grey cast iron has poor wear resistance and corrosion resistance, corrosion occurs at the mounting portion of the brake disc if the wheel bearing assembly is used for a long period of time. Due to such corrosion, the phenomenon where the brake disc gets stuck to the rotating element of the wheel bearing assembly has occurred.

When the brake disc gets stuck to the rotating element of the wheel bearing assembly, the problem of having to replace the entire wheel bearing assembly together with the brake disc may occur due to the difficulty in replacing the brake disc.

Moreover, if the brake disc is separated in a state where the brake disc is stuck to the rotating element of the wheel bearing assembly, there was a problem of having to precisely polish the brake disc before re-mounting the brake disc due to the uneven surface state of the mounting surface of the rotating element to which the brake disc is mounted.

If the mounting surface is not precisely polished and if even a small gap is generated between the brake disc and the rotating element, it may result in a problem that noise is generated during the operation of the brake device.

As a result, there is a need to reduce the weight of a wheel bearing assembly and improve the ease of assembly thereof as well as to enhance the heat dissipation properties of a brake disc by improving a fastening method between a wheel bearing and a brake disc.

SUMMARY

Accordingly, the present invention has been made in view of the considerations mentioned above and provides a wheel bearing assembly capable of reducing the overall weight and manufacturing cost by removing unnecessary portions, improving the fuel efficiency when mounted to a vehicle, and achieving an improvement in heat dissipation of a brake disc together with a performance improvement of a brake device as well as an improvement in ease of assembly of a brake disc and a wheel bearing.

To achieve the objects above, according to one embodiment of the present invention, a wheel bearing assembly may include: a wheel hub fastened to a vehicle wheel so as to rotate as a unit and having a plurality of fastening protrusion portions; and a brake disc having a plurality of fastening protrusion portions respectively fastened to the plurality of fastening protrusion portions of the wheel hub, wherein the plurality of fastening protrusion portions of the wheel hub protrude radially outward, the plurality of fastening protrusion portions of the brake disc protrude radially inward, and the plurality of fastening protrusion portions of the wheel hub and the plurality of fastening protrusion portions of the brake disc may be fastened to each other while being axially overlapped.

According to another embodiment of the present invention, a wheel bearing assembly may include: a wheel hub fastened to a vehicle wheel so as to rotate as a unit and having a plurality of fastening protrusion portions; and a brake disc having a plurality of fastening protrusion portions respectively fastened to the plurality of fastening protrusion portions of the wheel hub, wherein the wheel hub includes a cylindrical portion and a flange portion formed to extend radially outward from the cylindrical portion and to continuously extend in a circumferential direction, the plurality of fastening protrusion portions of the wheel hub protruding radially outward at a radial outer edge of the flange portion and being disposed to be spaced apart in fixed intervals along the circumferential direction, and wherein the flange portion includes a weight reducing portion having a reduced thickness in an axial direction and a head portion integrally formed with the weight reducing portion so as to continuously extend in the circumferential direction along a radial outer edge of the weight reducing portion and formed to have a larger thickness than the thickness of the weight reducing portion, the plurality of fastening protrusion portions of the wheel hub being formed on a radial outer circumferential surface of the head portion.

A seating protrusion on which the plurality of fastening protrusion portions of the brake disc are seated and supported may be formed in the head portion.

The seating protrusion may be formed to axially protrude beyond the plurality of fastening protrusion portions of the wheel hub and to continuously extend along the circumferential direction.

The wheel hub may be made by a forging method using a steel material.

According to a further embodiment of the present disclosure, a wheel bearing assembly may include: a wheel hub fastened to a vehicle wheel so as to rotate as a unit and having a plurality of fastening protrusion portions; and a brake disc having a plurality of fastening protrusion portions respectively fastened to the plurality of fastening protrusion portions of the wheel hub, wherein the brake disc includes two sliding portions generating a frictional brake force by friction with a friction material and disposed axially spaced apart from one another and a plurality of ribs disposed in an axial separation space between the two sliding portions and integrally connecting the two sliding portions to form a plurality of air passages, and wherein the plurality of fastening protrusion portions of the brake disc are disposed along a radial inner edge of one of the sliding portions to be spaced apart in fixed intervals in a circumferential direction.

The brake disc may be made by a casting method using a grey cast iron material.

Sliding surfaces of the two sliding portions may be run-out processed through a polishing process in a state in which the brake disc and the wheel bearing are fastened to and assembled with each other.

The weight reducing portion may include a plurality of weight reducing portions formed circumferentially spaced apart from one another, reinforcing ribs may be formed between the weight reducing portions, and hub bolts for fastening the wheel hub to the vehicle wheel may be inserted into and fastened to the reinforcing ribs.

Radial outer end portions of the reinforcing ribs may be formed to be positioned between the fastening protrusion portions of the wheel hub.

The wheel bearing assembly may further include: an inner race coupled to the wheel hub by means of an axial spline by being fitted thereto so as to rotate as a unit and coupled through a driving member for receiving an engine torque and a face spline so as to rotate together as a unit; an outer race rotatably supporting the wheel hub and the inner race by being axially fitted thereto; rolling bodies interposed between the outer race and the wheel hub and between the outer race and the inner race so that the wheel hub and the inner race can be rotated relative to the outer race; and seals respectively installed at an inlet of an axial separation space between the inner race and the outer race, and an inlet of an axial separation space between the outer race and the wheel hub so as to prevent entry of a foreign substance.

The plurality of ribs may be formed at fixed intervals in an axial direction and a circumferential direction, and the plurality of air passages may be formed between the plurality of ribs.

Among the plurality of ribs, the inner ribs located radially on an inner side may include a plurality of inner ribs and may be formed at fixed intervals along a radial inner edge of the sliding portion, and the plurality of fastening protrusion portions of the brake disc may be formed to continuously extend from the inner ribs.

The width between the plurality of inner ribs may be formed to be larger than the width of the air passages.

The plurality of ribs may have a triangular shape or a diamond shape.

According to a yet further embodiment of the present invention, a wheel bearing assembly may include: a wheel hub fastened to a vehicle wheel so as to rotate as a unit and having a ring-shaped fastening portion; and a brake disc having a ring-shaped fastening portion fastened to the fastening portion of the wheel hub, wherein the fastening portion of the wheel hub protrudes radially outward, the fastening portion of the brake disc protrudes radially inward, and a plurality of fastening protrusion portions of the wheel hub and the fastening portion of the brake disc may be fastened to each other while being axially overlapped.

The wheel hub may include a cylindrical portion and a flange portion formed to extend radially outward from the cylindrical portion and to continuously extend in a circumferential direction, and the fastening portion of the wheel hub may be formed at a radial outer edge of the flange portion so as to protrude radially outward.

The flange portion may include a weight reducing portion having a reduced thickness in an axial direction and a head portion integrally formed with the weight reducing portion so as to continuously extend in a circumferential direction along a radial outer edge of the weight reducing portion and formed to have a larger thickness than the weight reducing portion, and the fastening portion of the wheel hub may be formed at a radial outer circumferential surface of the head portion.

The wheel hub may be made by a forging method using a steel material.

The brake disc may be made by a casting method using a grey cast iron material.

The plurality of fastening protrusion portions of the wheel hub and the fastening portion of the brake disc may be fastened by disc bolts.

The disc bolts may be flush head disc bolts.

Bushes may be coupled to the disc bolts.

The wheel bearing assembly may further include: an inner race coupled to the wheel hub by press-fitting the wheel hub therein and coupled through a driving member for receiving an engine torque and a face spline so as to rotate as a unit; an outer race rotatably supporting the wheel hub and the inner race by being axially fitted thereto; rolling bodies interposed between the outer race and the wheel hub and between the outer race and the inner race so that the wheel hub and the inner race can be rotated relative to the outer race; and seals respectively installed at an inlet of an axial separation space between the inner race and the outer race, and an inlet of an axial separation space between the outer race and the wheel hub so as to prevent entry of a foreign substance.

An orbital forming portion bent radially outward may be formed in the wheel hub, and a shoulder with which the orbital forming portion engages may be formed in the inner race.

As described above, in the wheel bearing assembly according to embodiments of the present invention, the wheel hub is configured with a head portion, a weight reducing portion, and a plurality of fastening protrusion portions, and is manufactured through a forging process using a steel material, so that the productivity can be increased, and the cooling capability can be increased through suitably shaped ribs provided at a brake disc and air passages formed thereby.

Further, it is possible to reduce the overall weight and improve the fuel efficiency of a vehicle by removing unnecessary portions. It is also possible to reduce the manufacturing cost and replacement cost of a brake disc by reducing the material for the brake disc.

In addition, by polishing sliding portions of the brake disc through the polishing process in a state in which the brake disc is fastened to the wheel bearing and assembled together, the run-out properties can be enhanced compared with the prior art in which a brake disc and a wheel hub are individually subjected to run-out processing and then assembled together. As a result, it is possible to improve not only a brake judder phenomenon by reducing run-out but also squeal noise.

DETAILED DESCRIPTION

Embodiments of the present invention will now be described in detail with reference to the accompanying drawings.

Figure 1:
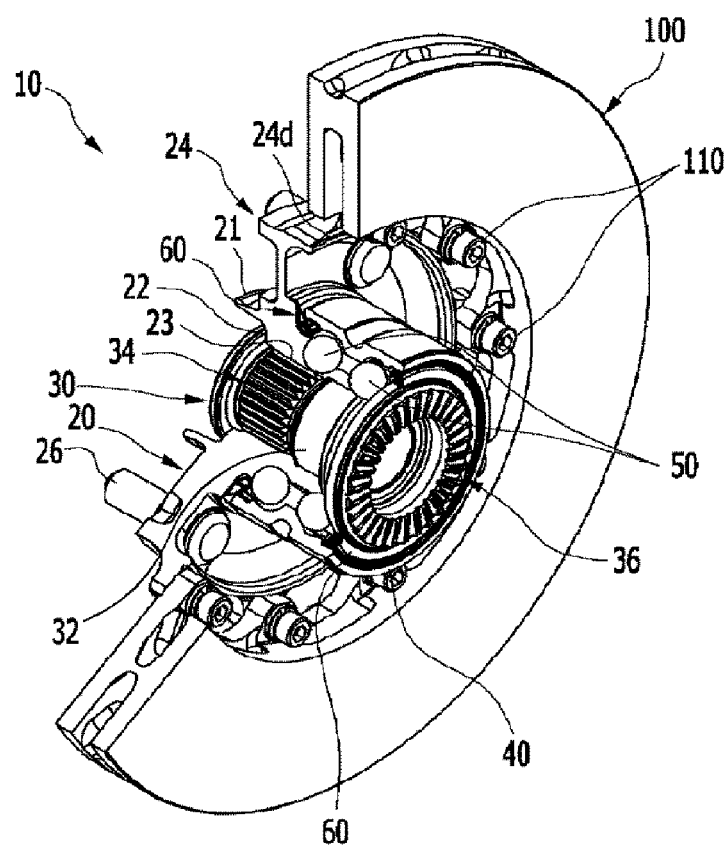
FIG. 1 is a partial cutaway perspective view of a wheel bearing assembly according to an embodiment of the present invention.

Referring to FIG. 1, the wheel bearing assembly according to an embodiment of the present invention may include a wheel bearing 10 and a brake disc 100 fastened to the wheel bearing 10 so as to rotate as a unit.

The brake disc 100 is fastened to the wheel bearing 10 by a plurality of disc bolts 110 so that the brake disc 100 can be separated from the wheel bearing 10 in case the brake disc 100 is repaired or replaced due to wear, etc.

The wheel bearing 10 may include a wheel hub 20, an inner race 30, an outer race 40, and rolling bodies 50.

The wheel hub 20 may include a cylindrical portion 22 having two sides that are open and face opposite directions along an axis direction, and a flange portion 24 formed integrally with the cylindrical portion 22 so as to extend radially outward from the cylindrical portion 22.

The inner race 30 may be inserted to penetrate the cylindrical portion 22 and may be fastened to the cylindrical portion 22 so as to rotate as a unit.

Teeth and tooth grooves may be formed on a portion of the inner circumferential surface of the cylindrical portion 22 to extend along the axial direction. The teeth and the tooth grooves may be alternately disposed in the circumferential direction to form an axial spline 23.

The inner race 30 may include a cylindrical portion 32 having two sides that are open and face opposite directions along the axis direction, and having an outer circumferential surface.

An axial spline 34 may also be formed on a portion of the outer circumferential surface of the cylindrical portion 32 of the inner race 30 facing a portion of the inner circumferential surface of the cylindrical portion 22 of the wheel hub 20 in a state in which the inner race 30 is inserted to penetrate the cylindrical portion 22 of the wheel hub 20.

The axial spline 34 of the inner race 30 may have a structure in which teeth and tooth grooves corresponding to the teeth and the tooth grooves of the axial spline 23 of the wheel hub 20 are formed to extend in the axial direction and are alternately disposed in the circumferential direction.

Accordingly, when the inner race 30 is inserted into and assembled with the cylindrical portion 22 of the wheel hub 20, if the axial spline 23 of the wheel hub 20 is meshed and coupled with the axial spline 34 of the inner race 30, the inner race 30 and the wheel hub 20 may be coupled together so as to rotate as a unit due to the coupling of the axial splines 23 and 34.

A face spline 36 may be formed on one axial end surface of the inner race 30.

The face spline 36 may have a structure in which teeth and tooth grooves are formed on one end surface of the inner race 30 so as to extend radially outward and are alternately disposed in the circumferential direction.

A driving member (not shown) may be coupled with the face spline 36 of the inner race 30, for example a face spline of a constant velocity joint receiving a torque from an engine may be meshed and coupled with the face spline 36 of the inner race 30 so that the inner race 30 and the constant velocity joint rotate as a unit.

The torque of the engine transmitted to the inner race 30 through the constant velocity joint is transmitted to the wheel hub 20. A vehicle wheel (not shown) is fastened to the wheel hub 20 so that the torque of the engine is transmitted to the vehicle wheel via the constant velocity joint, the inner race 30, and the wheel hub 20.

A pilot 21 is formed on one end surface of the cylindrical portion 22 of the wheel hub 20 to extend in the axial direction, and serves as an assembly guide when the vehicle wheel is fastened to and assembled with the wheel hub 20.

A plurality of axially-penetrating hub bolts 26 is fastened to the flange portion 24 of the wheel hub 20. The hub bolts 26 are fastened to the vehicle wheel so that the wheel hub 20 and the vehicle wheel are coupled to rotate as a unit due to the fastening of the hub bolts 26.

A wheel hub raceway surface and an inner race raceway surface are formed on a portion of the outer circumferential surface of the cylindrical portion 22 of the wheel hub 20 and a portion of the outer circumferential surface of the cylindrical portion 32 of the inner race 30, respectively. Thus, the rolling bodies 50 may be seated on and rotatably supported by the wheel hub raceway surface and the inner race raceway surface.

In an embodiment of the present invention, the rolling bodies 50 are ball rolling bodies disposed in the circumferential direction so that a plurality of the rolling bodies form a row and disposed to be spaced apart from each other in the axial direction. However, the present invention is not limited thereto and a single-row of rolling bodies or rolling bodies having a shape other than a ball shape may be installed.

The outer race 40 may include a cylindrical portion having two sides that are open and face opposite directions along the axis direction, and may be fixedly mounted to a non-rotating body such as a knuckle of a vehicle (not shown) or the like.

The inner diameter of the cylindrical portion of the outer race 40 is formed to be larger than the outer diameter of the cylindrical portion 32 of the inner race 30 and the outer diameter of the cylindrical portion 22 of the wheel hub 20. When the assembly of the wheel hub 20 and the inner race 30 is inserted into and assembled with the cylindrical portion of the outer race 40, a fixed separation space is formed between the inner circumferential surface of the cylindrical portion of the outer race 40 and the outer circumferential surfaces of the wheel hub 20 and the cylindrical portion 32 of the inner race 30. By inserting and mounting the rolling bodies 50 into the separation space, the assembly of the wheel hub 20 and the inner race 30 may be supported to facilitate relative rotation by the rolling bodies 50 with respect to the outer race 40 within the separation space.

In order to prevent a foreign substance from entering via the separation space, seals 60 may be installed at the inlet of the separation space between the outer race 40 and the inner race 30 and at the inlet of the separation space between the outer race 40 and the wheel hub 20, respectively.

Figure 2:
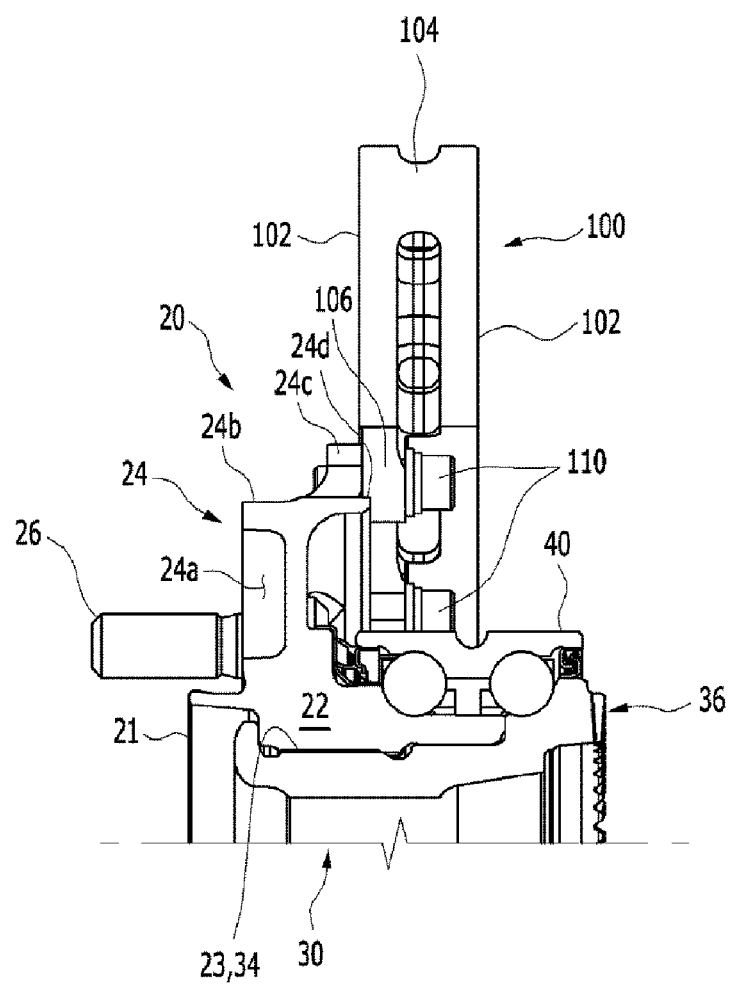
FIG. 2 is an enlarged perspective view of a main part of a wheel bearing assembly according to an embodiment of the present invention.

Referring to FIGS. 1 and 2, the flange portion 24 of the wheel hub 20 may have a shape widening radially outward from the cylindrical portion 22 and continuously extending in the circumferential direction.

Weight reducing portions 24a having a reduced thickness in the axial direction may be formed in the flange portion 24.

A head portion 24b may be integrally formed to continuously extend in the circumferential direction along radial outer edges of the weight reducing portions 24a.

The head portion 24b may be formed to extend in the axial direction and may be formed to have a thickness larger than the thickness of the weight reducing portions 24a.

Fastening protrusion portions 24c protruding radially outward may be formed on the radial outer circumferential surface of the head portion 24b.

The fastening protrusion portions 24c may include a plurality of fastening protrusion portions formed at fixed intervals in the circumferential direction.

Fastening screw holes penetrating in the axial direction may be formed in the fastening protrusion portions 24c so that the disc bolts 110 may be mounted to the fastening screw holes and fastened to the brake disc 100.

As the head portion 24b and the fastening protrusion portions 24c may be integrally formed with the cylindrical portion 22 through a forging process, the productivity for the wheel hub 20 can be improved and an increase in rigidity can be realized.

The wheel hub 20 may be made through a forging process using a steel (carbon steel) material, for example, S55CR.

The forging productivity for the wheel hub 20 may be improved by adjusting the position and depth of the weight reducing portions 24a.

The brake disc 100 may include two sliding portions 102 generating frictional brake force by selectively coming into contact with brake pads (friction materials), not shown, in response to a braking operation.

The two sliding portions 102 are disposed axially spaced apart from one another. A plurality of ribs 104 may be formed between the sliding portions 102, and the two sliding portions 102 may be integrally connected through the ribs 104.

The plurality of ribs 104 may be disposed at fixed intervals in the circumferential direction to form air passages between the ribs 104. By facilitating smooth air circulation through the air passages, the air cooling effect of the brake disc 100 can be improved.

Fastening protrusion portions 106 may be formed to protrude radially inward from the radial inner edge of one of the sliding portions 102.

The fastening protrusion portions 106 may include a plurality of fastening protrusion portions formed to be spaced apart by fixed intervals in the circumferential direction.

Fastening screw holes may be formed in the respective fastening protrusion portions 106 to penetrate them.

The respective fastening protrusion portions 106 may be formed to continuously extend from the radial inner end surfaces of the plurality of ribs 104 and thus increase the rigidity of the fastening protrusion portions 106.

The fastening protrusion portions 106 of the brake disc 100 may be formed in numbers corresponding to those of the fastening protrusion portions 24c of the wheel hub 20.

Accordingly, the wheel hub 20 and the brake disc 100 may be fastened together by inserting the disc bolts 110 to penetrate the respective fastening protrusion portions 24c and 106 and fastening them in a state in which the fastening protrusion portions 106 of the brake disc 100 are brought into contact with the fastening protrusion portions 24c of the wheel hub 20.

A seating protrusion 24d axially protruding beyond the fastening protrusion portions 24c and continuously extending in the circumferential direction may be formed in the head portion 24b of the wheel hub 20 so that the fastening screw holes of the fastening protrusion portions 24c of the wheel hub 20 and the fastening screw holes of the fastening protrusion portions 106 of the brake disc 100 can be easily aligned in the radial direction.

If the fastening protrusion portions 106 of the brake disc 100 are seated on the seating protrusion 24d, the fastening screw holes of the fastening protrusion portions 24c of the wheel hub 20 and the fastening screw holes of the fastening protrusion portions 106 of the brake disc 100 are automatically aligned to radially coincide with each other. Thus, the fastening work using the wheel hub 20 and the disc bolts 110 of the brake disc 100 is simplified.

If the number of the fastening protrusion portions 24c of the wheel hub 20 and the fastening protrusion portions 106 of the brake disc 100 is from five to ten, it is possible to fasten the brake disc 100 to the wheel hub 20 so that the brake disc 100 is stably supported on the wheel hub 20. In addition, it is possible to enhance the ventilation effect due to the smooth air flow through the air passages formed between the fastening protrusion portions 106 of the brake disc 100.

The brake disc 100 may be made by a casting method using, for example, a grey cast iron material.

As the wheel hub 20 and the brake disc 100 are fastened together in a separable manner through respective fastening protrusion portions, it is possible to reduce the overall weight as compared with the prior art by removing unnecessary portions, thus facilitating the improvement of fuel efficiency of a vehicle.

Further, a reduction in the material of the brake disc 100 and a reduction in the replacement cost associated with replacing the brake disc 100 is facilitated by reducing the weight and size of the brake disc 100 having a relatively shorter lifespan than the wheel bearing 10 having a long lifespan.

In addition, by polishing the sliding portions 102 of the brake disc 100 through a polishing process in a state in which the brake disc 100 is fastened to and assembled with the wheel bearing 10, it is possible to reduce the run-out as compared with the prior art in which a brake disc and a wheel hub are individually subjected to a run-out (a deflection amount with respect to a reference plane) processing and are then assembled together. As a result, it is possible not only to improve a judder phenomenon of the brake device caused by a run-out defect, but also to reduce squeal noise.

Figure 3:
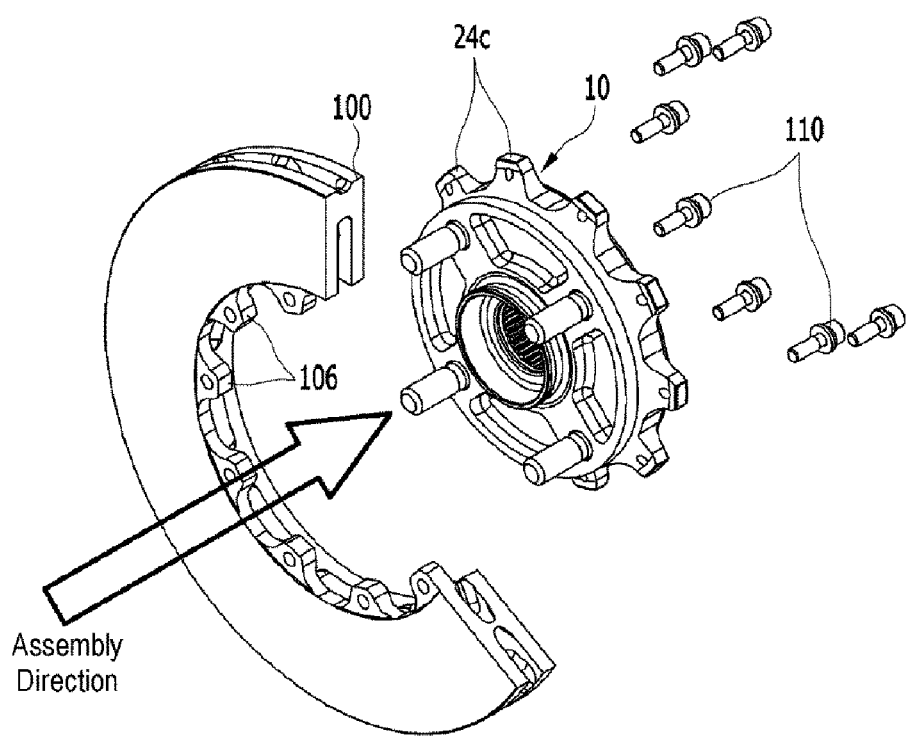
FIGS. 3 to 5 are views illustrating the assembly of a wheel bearing assembly according to an embodiment of the present invention.
Figure 4:
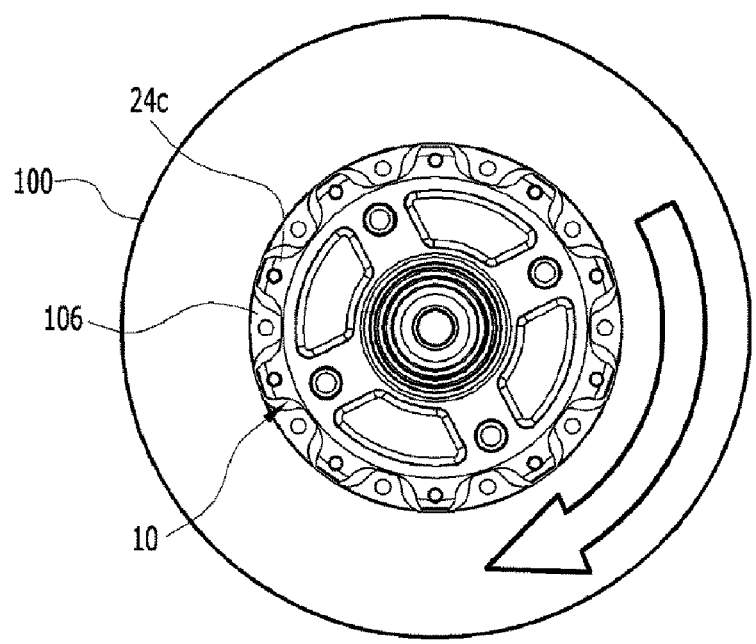

Referring to FIG. 3, the brake disc 100 is assembled by fitting it towards the side of the wheel bearing 10 where the hub bolts 26 of the wheel bearing 10 protrude. At this time, as shown in FIG. 4, the brake disc 100 is assembled so that the fastening protrusion portions 106 of the brake disc 100 are positioned in the spaces between the fastening protrusion portions 24c of the wheel bearing 10.

In other words, when assembling the brake disc 100 and the wheel bearing 10, the fastening protrusion portions 24c and 106 are assembled such that they do not interfere with one another.

Then, when the brake disc 100 is rotated as indicated by an arrow, the fastening protrusion portions 106 of the brake disc 100 and the fastening protrusion portions 24c of the wheel bearing 10 axially overlap and coincide with one another. If, in this state, the plurality of disc bolts 110 are inserted through respective fastening screw holes and fastened, the mutual assembly of the brake disc 100 and the wheel bearing 10 is completed.

The disc bolts 110 may be fastened in the direction opposite to the assembly direction of the brake disc 100.

The aforementioned assembly of the brake disc 100 and the wheel bearing 10 can be performed from both directions, at the inner side or the outer side in relation to the width direction of a vehicle, so that the assembly productivity, maintenability, and serviceability can be improved.

Figure 5:
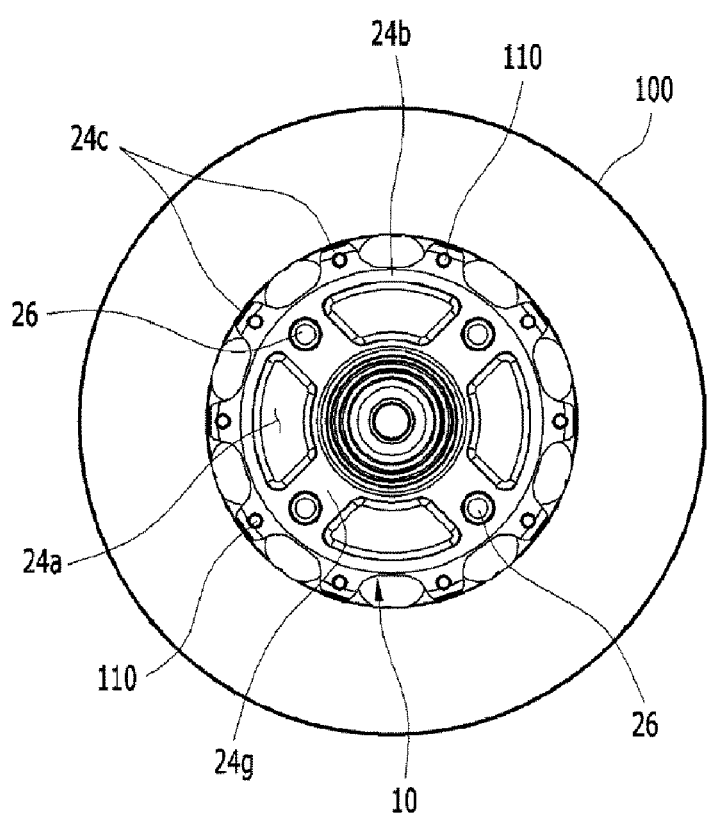

Referring to FIG. 5, although the weight reducing portions 24a of the wheel hub 20 are illustrated as being formed at four locations circumferentially spaced apart from one another, the weight reducing portions 24a may be formed in a number greater than or less than four. Reinforcing ribs 24g may be positioned between the weight reducing portions 24a, and fastening holes to which the hub bolts 26 are fastened may be formed in the reinforcing ribs 24g.

Further, if the radial outer end portions of the reinforcing ribs 24g are positioned between the fastening protrusion portions 24c, the fastening holes of the hub bolts 26 are located between the fastening protrusion portions 24c such that the overall fastening rigidity of the wheel hub 20 may be increased.

Figure 6:
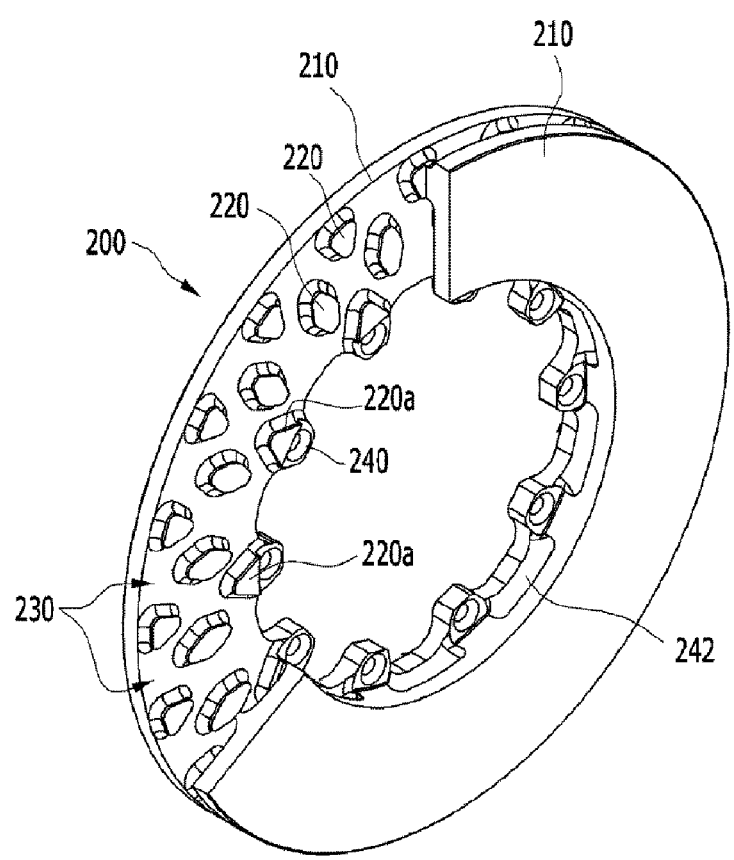
FIG. 6 is a partial cutaway perspective view of a brake disc according to another embodiment of the present invention.

Referring to FIG. 6, a brake disc 200 according to another embodiment of the present invention may include two sliding portions 210 formed in a disc shape and disposed axially spaced apart from one another, and a plurality of ribs 220 formed in an axial separation space between the two sliding portions 210.

The two sliding portions 210 may be integrally connected to each other by the plurality of ribs 220.

The plurality of ribs 220 are formed in a predetermined shape and are disposed axially and circumferentially spaced apart from one another. Air passages 230 allowing an air flow may be formed between the plurality of ribs 220.

The plurality of ribs 220 may have various shapes such as a triangular shape, a quadrangular shape, a diamond shape or the like.

The air passages 230 may be formed in various shapes such as a triangular shape, a quadrangular shape, a diamond shape or the like, according to the form of arrangement of the plurality of ribs 220.

Fastening protrusion portions 240 may be formed at the radial inner edge of one of the sliding portions 210 so as to protrude radially inward.

The fastening protrusion portions 240 may include a plurality of fastening protrusion portions formed at fixed intervals in the circumferential direction.

The fastening protrusion portions 240 may be fastened to the fastening protrusion portions 24c of the wheel hub 20 by the disc bolts 110.

In order to increase the rigidity thereof, the fastening protrusion portions 240 may be formed to have a continuous structure with the ribs 220a.

In other words, some inner ribs 220a among the plurality of ribs 220 may include a plurality of ribs formed at fixed intervals along the radial inner edge of the sliding portion 210. The fastening protrusion portions 240 may be formed to continuously extend from the inner ribs 220a.

The brake disc 200 according to the present embodiment may improve the air flowability through the air passages 230 having various shapes.

Further, outflow ports 242 formed between the inner ribs 220a are formed to have a wider width than the air passages 230. Thus, the heat dissipation capability of the brake disc 200 may be increased by enhancing the flowability of air.

The brake disc 200 may be made by a casting method using a grey cast iron material.

Figure 7:
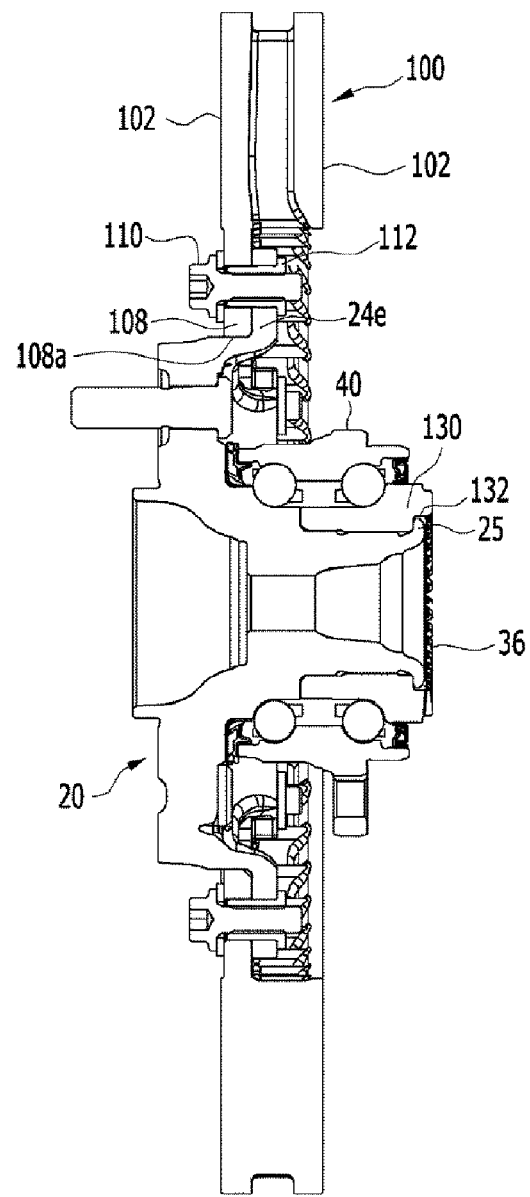
FIG. 7 is a sectional view of a wheel bearing assembly according to a further embodiment of the present invention.
Figure 8:
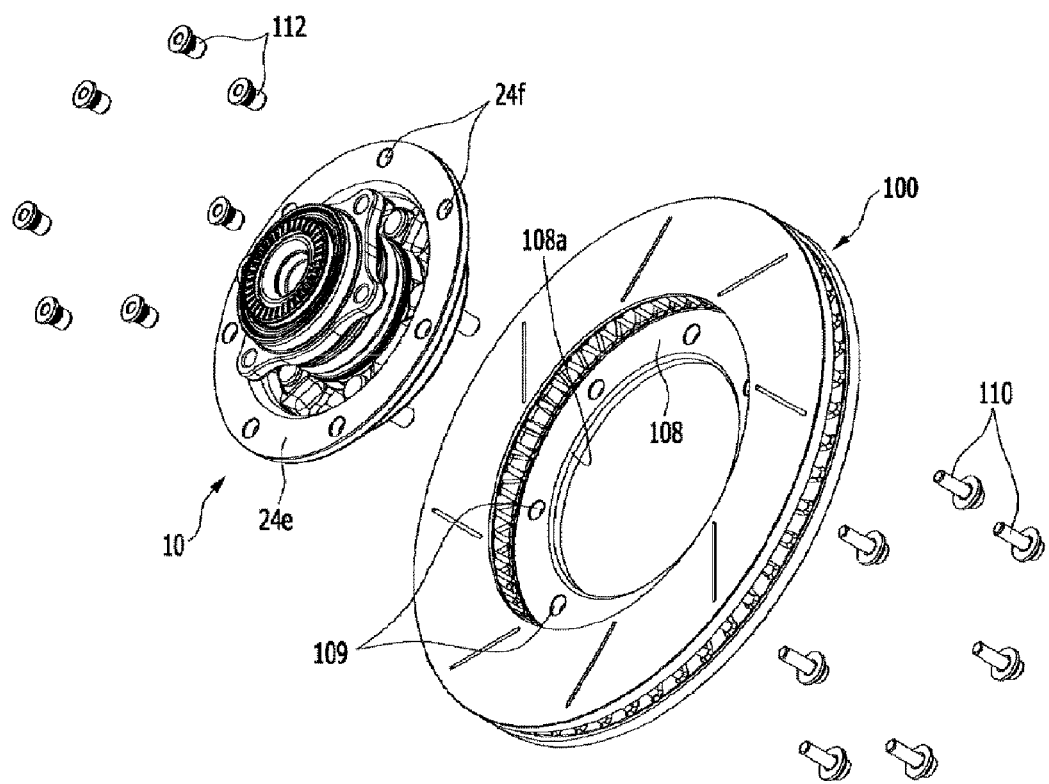
FIG. 8 is an exploded perspective view of a wheel bearing and a brake disc shown in FIG. 7.

Referring to FIGS. 7 and 8, a wheel bearing assembly according to another embodiment of the present invention is different in configuration in that the wheel hub 20 is press-fitted into the inner race 130 and coupled thereto.

In order to prevent separation of the inner race 130 and the wheel hub 20 in a state in which the wheel hub 20 is press-fitted into the inner race 130, an orbital forming portion 25 bent radially outward is formed at one axial end portion of the wheel hub 20.

The orbital forming portion 25 may be coupled so as to engage with a shoulder 132 formed in the inner race.

In addition, a substantially ring-shaped fastening portion 108 is formed along the radial inner edge of the sliding portion 102 of the brake disc 100. A plurality of fastening holes 109 are formed along the circumferential direction by penetrating the fastening portion 108. Disc bolts 110 are inserted into the fastening holes 109 and are fastened to the fastening holes 24f of the fastening portion 24e of the wheel hub 20, such that the wheel hub 20 and the brake disc 100 may be fastened to each other.

Unlike the fastening protrusion portions 24c shown in FIG. 3, the fastening portion 24e of the wheel hub 20 may have a ring shape continuously extending in the circumferential direction. Further, the fastening holes 24f may include a plurality of fastening holes formed at fixed intervals along the circumferential direction.

When the brake disc 100 and the wheel hub 20 are assembled in the axial direction, the inner edge 108a of the fastening portion 108 of the brake disc 100 may come into surface contact with the outer circumferential surface of the wheel hub 20 and may serve as a guide for assembling the brake disc 100 and the wheel hub 20.

In a state in which the fastening portion 108 of the brake disc 100 and the fastening portion 24e of the wheel hub 20 axially overlap with one another, bushes 112 are inserted into the fastening holes 109 of the fastening portion 108 of the brake disc 100 and the fastening holes 24f of the fastening portion 24e of the wheel hub 20, and the disc bolts 110 may be fastened to the bushes 112.

Figure 9:
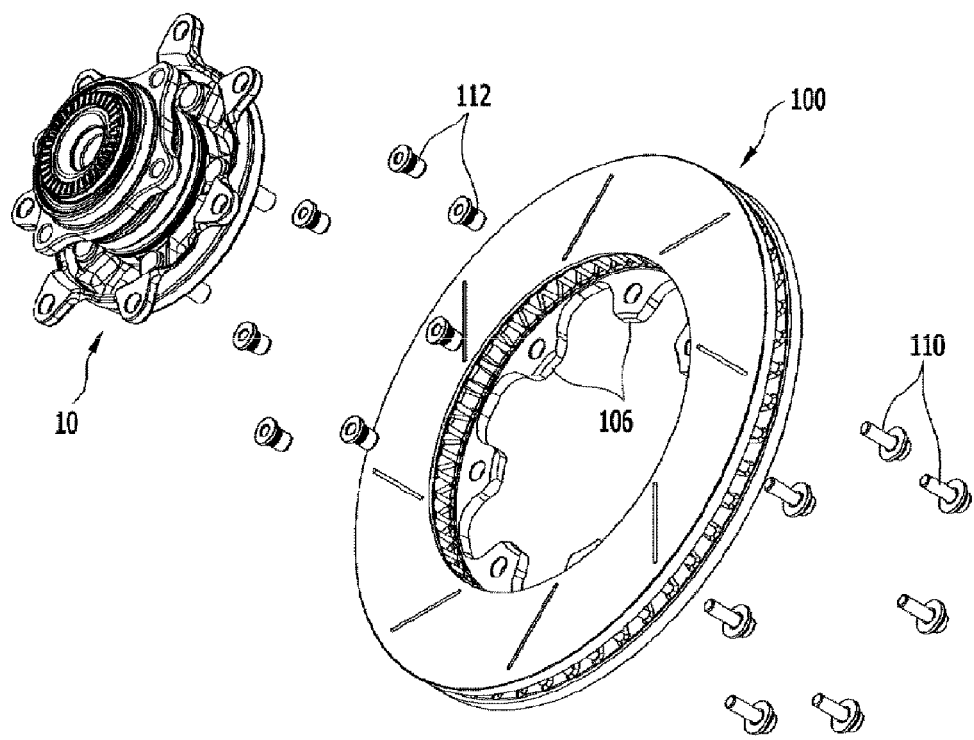
FIG. 9 is an exploded perspective view of a wheel bearing and a brake disc according to another embodiment of the present invention.

Even in the embodiment shown in FIG. 3, when fastening the disc bolts 110 to the disc brake 100 and the wheel hub 20, bushes 112 may be applied as shown in FIG. 9.

Figure 10:
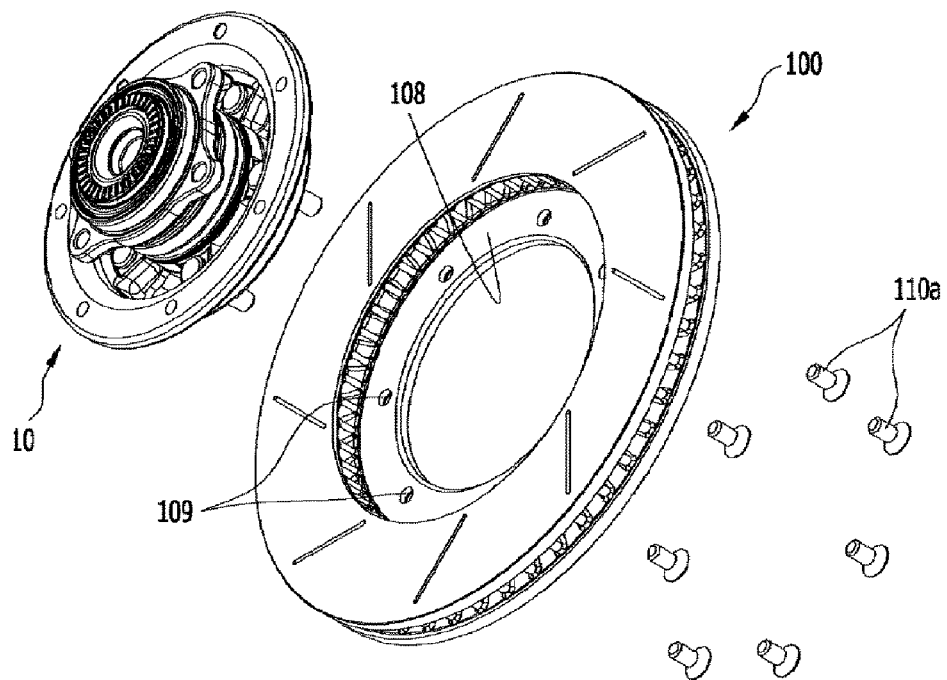
FIG. 10 is an exploded perspective view of a wheel bearing and a brake disc according to a further embodiment of the present invention.
Figure 11:
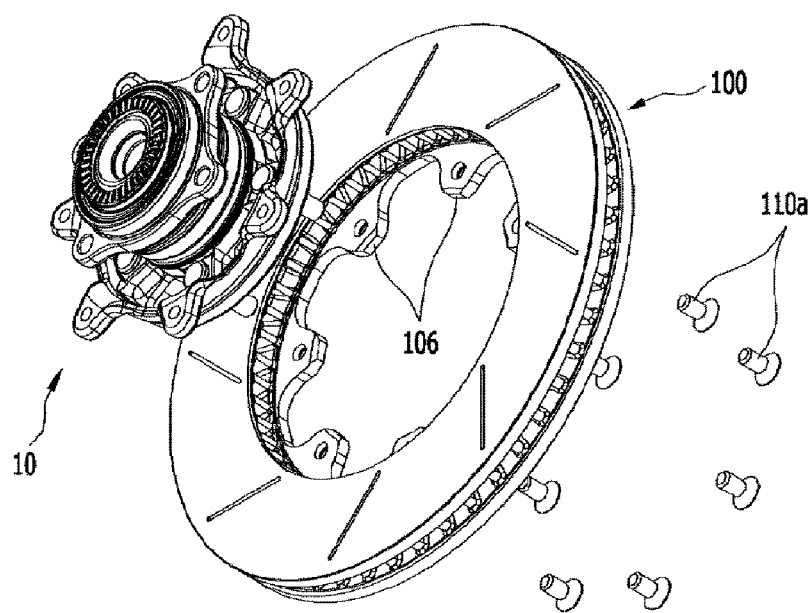
FIG. 11 is an exploded perspective view of a wheel bearing and a brake disc according to a further embodiment of the present invention.

Further, as shown in FIGS. 10 and 11, flush head disc bolts 110a may be used as the disc bolts to fasten the brake disc 100 and the wheel hub 20.

While preferred embodiments of the present invention have been described above, the present invention is not limited to the embodiments described above. The present invention encompasses all modifications falling within the equivalent scope, which can be easily made from the embodiments of the present invention by a person having ordinary knowledge in the technical field to which the present invention belongs.

What is claimed is:

1. A wheel bearing assembly, comprising:
a wheel hub fastened to a vehicle wheel so as to rotate as a unit and having a ring-shaped fastening portion; and
a brake disc having a ring-shaped fastening portion fastened to the fastening portion of the wheel hub,
wherein the fastening portion of the wheel hub protrudes radially outward, the fastening portion of the brake disc protrudes radially inward, and the fastening portion of the wheel hub and the fastening portion of the brake disc are fastened to each other while being axially overlapped,
wherein the wheel hub includes a cylindrical portion and a flange portion formed to extend radially outward from the cylindrical portion and to continuously extend in a circumferential direction, and
wherein the fastening portion of the wheel hub is formed at a radial outer edge of the flange portion so as to protrude radially outward.

2. The wheel bearing assembly of claim 1, wherein the flange portion includes a weight reducing portion having a reduced thickness in an axial direction and a head portion integrally formed with the weight reducing portion so as to continuously extend in a circumferential direction along a radial outer edge of the weight reducing portion and formed to have a larger thickness than the weight reducing portion, and the fastening portion of the wheel hub is formed at a radial outer circumferential surface of the head portion.

3. The wheel bearing assembly of claim 1, wherein the wheel hub is made by a forging method using a steel material.

4. The wheel bearing assembly of claim 1, wherein the brake disc is made by a casting method using a grey cast iron material.

5. The wheel bearing assembly of claim 1, wherein the fastening portion of the wheel hub and the fastening portion of the brake disc are fastened by disc bolts.

6. The wheel bearing assembly of claim 5, wherein the disc bolts are flush head disc bolts.

7. The wheel bearing assembly of claim 5, wherein bushes are coupled to the disc bolts.

8. The wheel bearing assembly of claim 1, further comprising:
an inner race coupled to the wheel hub by press-fitting the wheel hub therein and coupled through a driving member for receiving an engine torque and a face spline so as to rotate as a unit;
an outer race rotatably supporting the wheel hub and the inner race by being axially fitted thereto;
rolling bodies interposed between the outer race and the wheel hub and between the outer race and the inner race so that the wheel hub and the inner race can be rotated relative to the outer race; and
seals respectively installed at an inlet of an axial separation space between the inner race and the outer race, and an inlet of an axial separation space between the outer race and the wheel hub so as to prevent entry of a foreign substance.

9. The wheel bearing assembly of claim 8, wherein an orbital forming portion bent radially outward is formed in the wheel hub, and a shoulder with which the orbital forming portion engages is formed in the inner race.

10. A wheel bearing assembly, comprising:
a wheel hub fastened to a vehicle wheel so as to rotate as a unit and having a plurality of fastening protrusion portions; and
a brake disc having a plurality of fastening protrusion portions respectively fastened to the plurality of fastening protrusion portions of the wheel hub,
wherein the plurality of fastening protrusion portions of the wheel hub protrude radially outward, the plurality of fastening protrusion portions of the brake disc protrude radially inward, and the plurality of fastening protrusion portions of the wheel hub and the plurality of fastening protrusion portions of the brake disc are fastened to each other while being axially overlapped,
wherein the wheel hub includes a cylindrical portion and a flange portion formed to extend radially outward from the cylindrical portion and to continuously extend in a circumferential direction, and
wherein the fastening portion of the wheel hub is formed at a radial outer edge of the flange portion so as to protrude radially outward.

11. The wheel bearing assembly of claim 10, wherein the brake disc includes two sliding portions generating a frictional brake force by friction with a friction material and disposed axially spaced apart from one another and a plurality of ribs disposed in an axial separation space between the two sliding portions and integrally connecting the two sliding portions to form a plurality of air passages, and
wherein the plurality of fastening protrusion portions of the brake disc are disposed along a radial inner edge of one of the sliding portions to be spaced apart in fixed intervals in a circumferential direction.

12. The wheel bearing assembly of claim 11, wherein the plurality of ribs are formed at fixed intervals in an axial direction and a circumferential direction, and the plurality of air passages are formed between the plurality of ribs, and
wherein the width between the plurality of inner ribs is formed to be larger than the width of the air passages.

13. The wheel bearing assembly of claim 12, wherein, among the plurality of ribs, the inner ribs located radially on an inner side include a plurality of inner ribs formed at fixed intervals along a radial inner edge of the one of the sliding portions, and the plurality of fastening protrusion portions of the brake disc are formed to continuously extend from the inner ribs.

14. The wheel bearing assembly of claim 11, wherein sliding surfaces of the two sliding portions are run-out processed through a polishing process in a state in which the brake disc and the wheel bearing are fastened to and assembled with each other.

15. The wheel bearing assembly of claim 10,
wherein the flange portion includes a weight reducing portion having a reduced thickness in an axial direction and a head portion integrally formed with the weight reducing portion so as to continuously extend in the circumferential direction along a radial outer edge of the weight reducing portion and formed to have a larger thickness than the thickness of the weight reducing portion,
wherein the plurality of fastening protrusion portions of the wheel hub are formed on a radial outer circumferential surface of the head portion and are disposed to be spaced apart in fixed intervals along the circumferential direction.

16. The wheel bearing assembly of claim 15, wherein a seating protrusion on which the plurality of fastening protrusion portions of the brake disc is seated and supported is formed in the head portion, and
wherein the seating protrusion is formed to axially protrude beyond the plurality of fastening protrusion portions of the wheel hub and to continuously extend along the circumferential direction.

17. The wheel bearing assembly of claim 15, wherein a plurality of reinforcing ribs extending radially are formed on the flange portion, wherein the weight reducing portion is provided as a plurality of weight reducing portions formed between the reinforcing ribs to be circumferentially spaced apart from one another, and hub bolts for fastening the wheel hub to the vehicle wheel are inserted into and fastened to the reinforcing ribs, and wherein radial outer end portions of the reinforcing ribs are formed to be positioned between the fastening protrusion portions of the wheel hub.

18. The wheel bearing assembly of claim 10, further comprising:

an inner race coupled to the wheel hub by means of an axial spline by being fitted thereto so as to rotate as a unit and coupled through a driving member for receiving an engine torque and a face spline so as to rotate as a unit;

an outer race rotatably supporting the wheel hub and the inner race by being axially fitted thereto;

rolling bodies interposed between the outer race and the wheel hub and between the outer race and the inner race so that the wheel hub and the inner race can be rotated relative to the outer race; and seals respectively installed at an inlet of an axial separation space between the inner race and the outer race, and an inlet of an axial separation space between the outer race and the wheel hub so as to prevent entry of a foreign substance.

19. The wheel bearing assembly of claim 10, wherein the wheel hub is made by a forging method using a steel material, and the brake disc is made by a casting method using a grey cast iron material.

\* \* \* \* \*